Patented Jan. 5, 1943

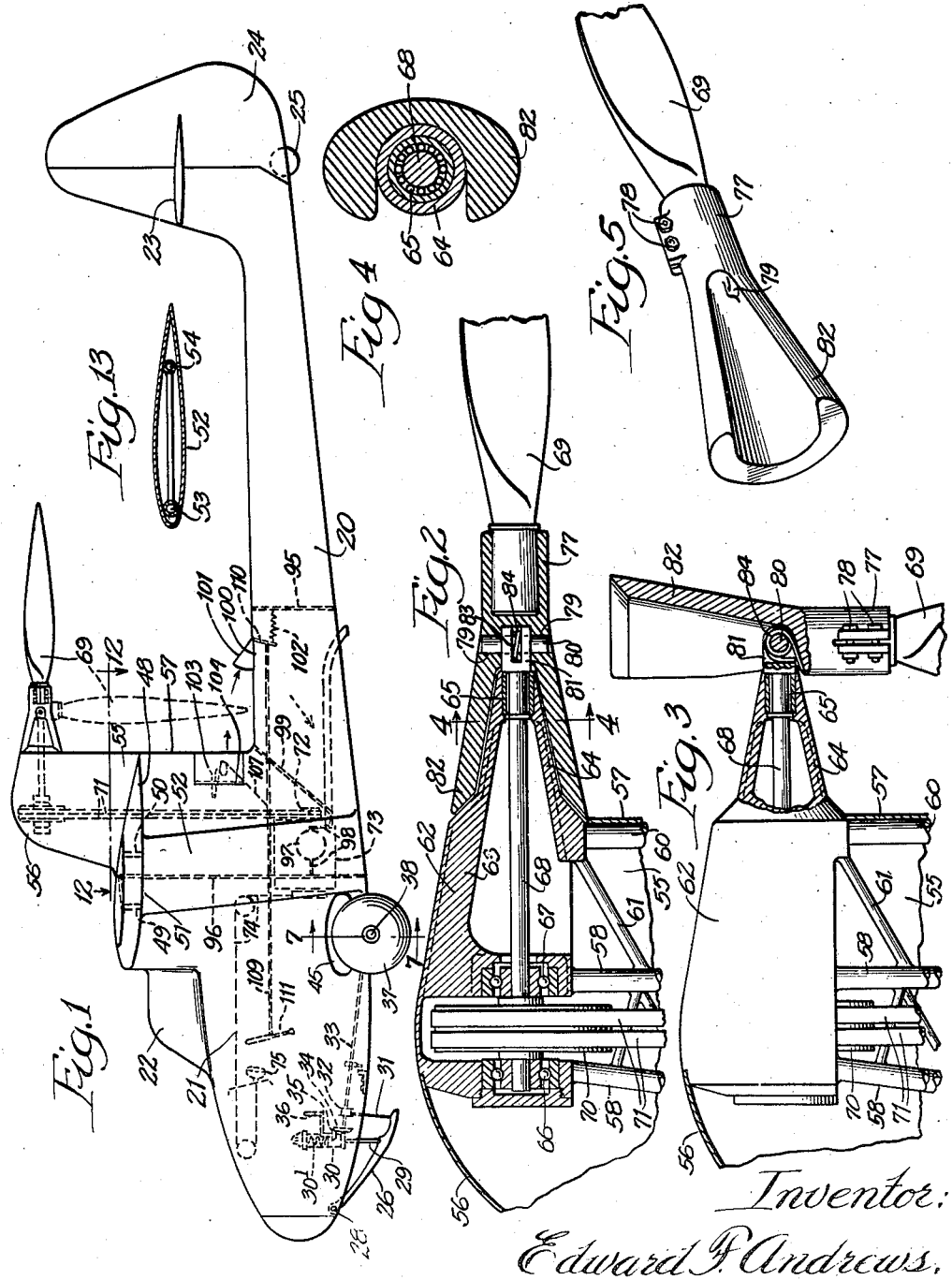
Jan. 5, 1943.  E. F. ANDREWS  2,307,654
AIRCRAFT
Filed Feb. 12, 1938  2 Sheets-Sheet 1
Inventor:
Edward F. Andrews,
By John F. Eakins
Attorney.

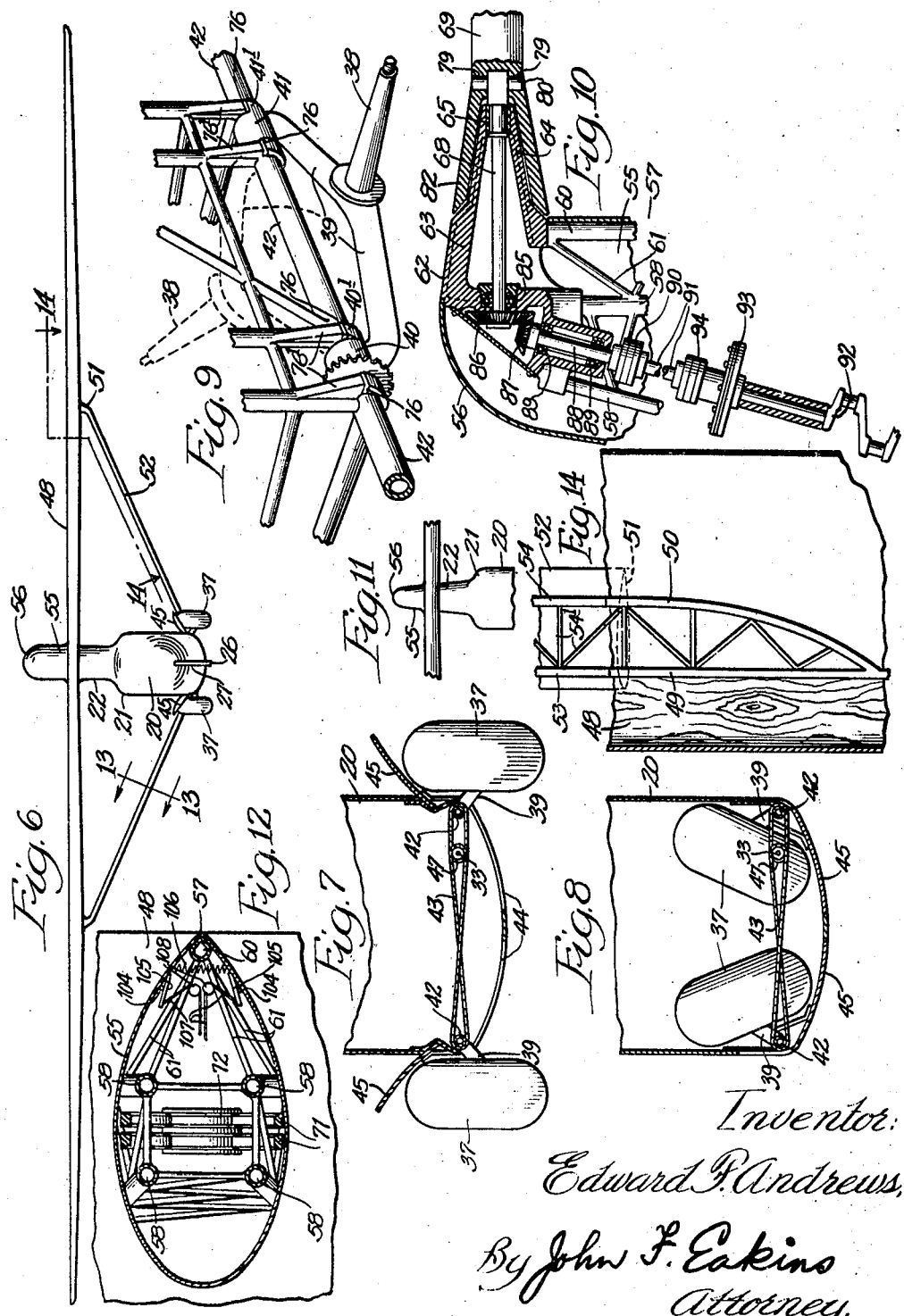

2,307,654

UNITED STATES PATENT OFFICE 2,307,654

AIRCRAFT

Edward F. Andrews, Chicago, Ill.

Application February 12, 1938, Serial No. 190,171

4 Claims. (Cl. 170—164)

This invention relates to aircraft and has for its principal object to provide an improved aircraft.

A further object of the invention is to provide an improved propeller and means associated therewith whereby the propeller automatically moves into a low drag position when it is no longer driven.

A further object of the present invention is the provision of a counterweighted propeller blade adapted to occupy a position generally perpendicular to the propeller shaft when the shaft is rotated, and which is automatically biased to a position substantially parallel to said shaft when the rotation of said shaft ceases.

It is a further object to provide a propeller blade having a counterweight which occupies a position generally perpendicular to the propeller shaft when the shaft is rotated, and which occupies a position substantially coaxial with said shaft with the counterweight partially surrounding and streamlining the shaft and its hub when the shaft rotates below a predetermined speed.

Other objects, advantages, and capabilities of the invention will appear from the following description of a preferred embodiment thereof, taken in conjunction with the accompanying drawings in which, Fig. 1 is a side elevation of a power soarer embodying my invention, the soarer being shown in soaring condition;

Fig. 2 is a longitudinal sectional view of the upper end of the propeller pylon shown in Fig. 1 on a larger scale;

Fig. 3 is a similar view showing the propeller in operating relation and showing the interior framework of the upper end of the pylon in elevation;

Fig. 4 is a sectional detailed view taken in the line 4—4 of Fig. 2;

Fig. 5 is a fragmentary perspective view of the propeller;

Fig. 6 is a front elevational view of the power soarer on a reduced scale;

Fig. 7 is a fragmentary sectional view taken in the line 7—7 of Fig. 1, showing the main landing wheels in the manner in which they are mounted and actuated;

Fig. 8 is a similar view showing the wheels in stowed relation;

Fig. 9 is a fragmentary perspective view showing the manner in which one of the main wheels is mounted;

Fig. 10 is a fragmentary sectional view similar to Fig. 2 showing a modified drive for the propeller;

Fig. 11 is a fragmentary view corresponding to the central portion of Fig. 6 illustrating the reduced width of the power pylon when the mechanism shown in Fig. 10 is employed;

Fig. 12 is a sectional plan view of the power pylon, the section being taken on the line 12—12 of Fig. 1;

Fig. 13 is a cross-sectional detailed view of one of the auxiliary wings, the section being taken on the line 13—13 of Fig. 6; and Fig. 14 is a plan view of one of the wings and one of the auxiliary wings, the upper enclosing portion of the wings being removed to show the enclosed supports, this view being seen as indicated by the arrows 14—14 on Fig. 6.

The drawings illustrate a power soarer, by which term it is intended to define an aircraft which is adapted to be raised by ordinary rising air currents, and which is provided with a motor of light weight whereby the aircraft may be sustained and transported from location to location in order to take advantage of rising air currents for soaring. The invention is not, however, intended to be limited to such a device since it embodies many features and aspects which are applicable also to airplanes which must be power driven in order to fly for sustained periods. The drawings illustrate, and the following description pertains not only to the improved propeller and the automatic movement thereof to a low drag position when its drive is terminated, but also to a number of other features described and claimed in certain of my copending applications. Among these are a retractible alighting gear arrangement and the related feature of covering openings in the fuselage into which the landing gear is retracted, which are disclosed and claimed in my copending applications Serial Nos. 148,085, filed June 14, 1937, and 386,511, filed April 2, 1941; a retracting ground contacting means adapted to prevent nosing over of the aircraft, the control of which is correlated to that of the landing gear and a propeller supporting and driving arrangement, which are disclosed and claimed in the latter of the two applications referred to, which, incidentally, is a division of the instant application.

Referring to the drawings, the reference numeral 20 designates the fuselage of the aircraft. The front part of the fuselage may be enlarged, especially in the case of an airplane, to provide a chamber 21 for the accommodation of two passengers who may sit side by side. The upper portion 22 of the chamber 21 may be in the form of a transparent housing in order to provide visibility for the passengers in all directions. The fuselage is provided with elevators 23 and with a rudder 24, both of which may be actuated in the usual manner. The rudder 24 provides bearings for a small wheel 25 which projects below the rudder and the adjacent portion of the fuselage as shown in Fig. 1. The wheel 25 being mounted on the rudder 24, the machine may be steered on the ground by means of the rudder controls.

Adjacent the nose of the fuselage, the aircraft is provided with a skid or other ground contacting means 26. This skid is capable of being drawn up into a slot 27 which extends longitudinally in the under surface of the nose of the fuselage. When so retracted, the skid 26 fills up the slot 27 so as to complete the smooth outer form of the fuselage. The skid 26 is pivotally connected to the fuselage at 28 and is pivotally connected to the rod 29 of a dash pot 30, which is in turn pivotally mounted within the fuselage. A spring $30^1$ within the dash pot 30 forces the rod 29 downward to the limit of its travel. The dash pot 30 strongly opposes sudden movements of the skid 26, while gradual movements of the skid from its position within its slot downwardly are permitted under the influence of the spring $30^1$, and gradual upward movements from its operating position are permitted when sufficient force is applied to overcome the spring $30^1$. A cable 31 has one end connected to the skid 26. The other end of the cable is connected to a drum 32 on a shaft 33 which is mounted for rotation within the fuselage. The shaft 33 carries a bevel gear 34 which meshes with a bevel gear 35 which is adapted to be manually or otherwise actuated, for instance, by means of a crank 36. It will readily be understood that when the crank 36 is actuated in one direction, the cable 31 will be wound up on the drum 32 and the skid 26 will be drawn upwardly into the slot 27 against the action of the spring $30^1$. When, however, the crank 36 is actuated in the opposite direction, the cable 31 will be unwound from the drum and the action of the spring $30^1$ will cause it to move downwardly. It will likewise be understood that when the skid 26 comes into forcible contact with the ground in landing, the dash pot 30 prevents the rapid upward movement of the skid 26 so that the skid 26 takes the impact which is in part communicated to the fuselage and in part dissipated as heat in the dash pot 30. The spring $30^1$ tends to maintain the skid 26 fully extended. A very effective braking action can be had by operating the elevator 23 so as to raise the tail and force the skid 26 firmly against the ground. The location of the skid 26 near the nose of the fuselage effectively prevents the aircraft from nosing over despite the relatively rearward position of the additional members of the alighting gear.

The aircraft is also provided with two main supporting wheels 37, 37 which are pivotally mounted on stub axles 38. The stub axles 38 are carried by yokes 39 which are pivotally mounted by means of bushings 40 and 41 on suitable longitudinal frame members 42 of the fuselage frame. The frame members 42 may suitably be located at the lower corners of the fuselage as shown in Figs. 7 and 8. The lower wall of the housing is provided with openings 44 through which the wheels 37 and the yokes 39 are adapted to pass into the interior of the fuselage, that is, from the position shown in Fig. 7 to the position shown in Fig. 8. The yokes 39 carry closure plates 45 which are adapted to close the openings 44 when the wheels 37 are moved into the position shown in Fig. 8. When the wheels 37 are projected from that position into the position shown in Fig. 7 for the purpose of supporting the aircraft on the ground, the plates 45 serve as mud guards to prevent mud or water from being splashed over the fuselage. When the wheels are in operating position, that is, the position shown in Fig. 7, abutments $40^1$ and $41^1$, which are integral with the bushings 40 and 41 respectively, engage the resilient damping pads 76 composed, for example, of shock absorbing rubber, which may be suitably carried by abutments $76^1$ carried by elements of the frame work of the fuselage, as shown in Fig. 9, so that components of the force applied to the wheels by contact with the ground may displace the wheels upwardly from their position in Fig. 7 only a limited amount, determined by the compression of the resilient damping pads 76. It will be understood that the pads 76 are shown by way of example only and that any suitable damping means may be substituted therefor. The wheels 37 are actuated in unison by means of a crossed chain 43 which extends around sprockets 46 which are integral with or are rigidly secured to the bushings 40 of the yokes 39. The chain 43 is operatively engaged by a sprocket wheel 47 which is rigidly carried by the shaft 33. It will thus be seen that when the skid 26 is released to move downwardly the wheels 37 are moved from their position shown in Fig. 8 to their position shown in Fig. 7 and that when the wheels 37 are again stowed within the fuselage, the skid 26 is drawn upwardly into the slot 27.

The aircraft is provided with a wing 48 which is located at an elevated point relative to the fuselage 20, being preferably located above the upper portion 22 of the chamber 21 and being preferably located immediately behind that chamber. The center portion of the wing is connected by members (not shown) to the framework of the fuselage. The wing 48 includes a main wing bar 49 which extends along the whole length of the wing and a rear wing bar or torsion resisting bar 50 which is shorter and terminates at a point somewhat beyond the location of the uniting structures 51 which connect the auxiliary wings 52 to the wing 48. Each auxiliary wing 52 is preferably united to the main wing 48 at a distance not more than a semi-span from the fuselage. The main wing bar 49 is located adjacent and preferably somewhat behind the aerodynamic center. The auxiliary wings 52 slope inwardly towards low positions on the fuselage 20 and they also slope rearwardly slightly as shown in Fig. 1. The auxiliary wing 52 as shown in Fig. 13 includes a forward bar 53 and a rear bar 54. The bars 49 and 50 of the main wing 48 are relatively close together. The bars 53 and 54 are spaced about the same distance so that they may be connected directly to the bars 49 and 50 respectively. The auxiliary wings are, however, preferably narrower than the main wings 48 so that the bars 53 and 54 are quite close to the forward and rear edges thereof. The auxiliary wings 52 are, as shown in Fig. 13, of airfoil form so that they create an additional lift which augments the lift of the main wing 48. The bars 53 and 54 are connected by struts $54^1$ which, as shown in Fig. 14, extend transversely and also diagonally with respect to the width of the wing 32.

Owing to the double triangular truss formed by the two wing bars 53 and 54 of the auxiliary wings and wing bars 49 and 50 of the main wings, the main wing 48 is braced very effectively against torsion at the point of juncture with the auxiliary wings 52. From this point outwardly, the wing bar 50 slopes forward, joining the main wing bar 49 at a point a short distance outwardly from the juncture. Outwardly from the juncture of the main and auxiliary wings, the center of mass of the wing is kept as far forward as possible, and torsion is taken by the D section formed by the main wing bar 49 and the stiff surface covering employed on the top and bottom surface of the wing forward of the bar. The area of the main wing 48 can also be reduced as a result of the effective lifting surface provided by the auxiliary wings 52. It is to be noted that the wheels 37 are located somewhat in front of the center of gravity of the machine when fully loaded so that with the wheels 37 projected, the wheel 25 will remain in contact with the ground although it will carry only a very light load. Under these circumstances, the skid 26 will substantially clear the ground. The position of the wheels 37 is, however, sufficiently close to the center of gravity so that the elevator 23 will control the angle of the aircraft with only a small relative airflow over its surface.

The propeller pylon is indicated by the reference numeral 55. This pylon extends upwardly from the fuselage 20 through the rear portion of the wing 48, terminating thereabove in a streamline upper end as shown at 56. In cross section, the pylon is of streamline form as shown in Fig. 12, terminating in a relatively thin rear edge 57 which is located adjacent to the rear edge of the wing 48. The pylon frame may consist of one or two pairs of laterally spaced, substantially vertical truss members 58 and a substantially vertical rear edge member 60. These vertical members are connected together by diagonal members 61 to form a highly rigid truss, including the rear edge member, which will be highly resistant against any tendency of the top of the pylon to be twisted or bent relative to the fuselage.

At their upper ends the posts 58 and 60 carry a bearing structure 62 which may suitably be an aluminum casting provided with suitable strengthening ribs 63. The upper surface of the casting 62 forms part of the streamlined surface 56 referred to previously. The casting 62 is provided with a rearward extension 64 which supports a bearing 65 located somewhat rearwardly of the edge 57. The casting 62 serves as a support for bearings 66 and 67 which may suitably be located in alignment with the two forward posts 58 and the two rearward posts 58 respectively. The three bearings 65, 66, and 67 are in alignment as shown in Fig. 2 and they rotatively support a horizontal shaft 68. The bearing 66 is a thrust bearing and is adapted to take the forward thrust exerted by the propeller 69 which is carried by the shaft 68. Between the two bearings 66 and 67, the shaft 68 rigidly carries a pulley 70 over which runs a plurality of V belts 71. The belts 71 extend downwardly through the pylon structure and pass around a pulley 72 of a motor 73. This motor is located at a low position in the fuselage as shown in Fig. 1. Since the motor must be adapted to be started during soaring, I provide a cable 74 which is connected to a handle 75 and to a suitable starting means on the engine. The handle 75 is located within reach of the passengers so that it may be actuated by them in order to start the engine.

The propeller 69 consists of a single blade, one end of which is received in a split socket 77. The blade 69 may be released from the socket 77 by loosening the bolts 78 so that the effective pitch of the propeller may be varied at will. The socket 77 is integral with a pair of bearings 79 which receive a pin 80 which is rigidly carried at the rear end of the shaft 68 in a direction at right angles to the shaft 68. The pin 80 may suitably be rigidly mounted in a bearing 81 carried by the rear end of the shaft 68. The inner faces of the bearings 79 have a working engagement with the sides of the block, as shown in Fig. 2. A counter weight 82, which is integral with the sockets 77 and the bearings 79, is located on the other side of the bearings 79 from the socket 77 so that it serves as an effective counterweight for the single blade 69 of the propeller. The counterweight 82 may suitably be in the form of a cradle which diverges away from bearings 79 so that it may be located in close conformity to the reduced rear extension 64 of the casting 63. In other words, the counterweight 82 is of generally conical form with one open side so as to permit it to become disengaged from the conical portion 64 of the casting 63 when the propeller moves from its position in Fig. 2 to its position in Fig. 3. The block 81 is provided with a slot 83 in which is located a spring 84. This spring bears against a portion of the block 81 and a portion of the socket 77, as shown in Fig. 3, so that this spring automatically tends to move the propeller 69 into alignment with the shaft 68, that is, into a horizontal position. This position is shown in full lines in Fig. 1 and it will be readily seen that when the propeller is not in rotation it is moved into this horizontal position, where it creates little drag opposing the movement of the aircraft. When, however, the engine is put into operation and the shaft 68 is caused to rotate, the counterweight 82, being out of balance with respect to the shaft 68, moves outwardly in the radial direction against the action of the spring 84, thus bringing the propeller 69 into operation. When the engine is stopped, the centrifugal effect also ceases and the spring 84 becomes effective to bring the propeller into the position in which it is shown in Fig. 2.

In the embodiment of the invention shown in Figs. 10 and 11, the shaft 68 is supported by two bearings 65 and 85, both provided in the casting 63. The bearing 85 is a thrust bearing. At its forward end, the shaft 68 carries a bevel gear 86 which is enmeshed with a bevel gear 87 carried by a shaft 88. The shaft 88 is supported in bearings 89 carried by the casting 63. The shaft 88 is connected by a universal joint 90 to a shaft 91 which extends downwardly through the pylon 55 towards the motor 73, the crankshaft of which is indicated by the reference numeral 92. The crankshaft 92 is connected through a friction clutch 93 and a universal joint 94 to the shaft 91. The shaft 91 may extend obliquely as shown in Fig. 10 in order that the engine 73 may be properly located to bring the center of gravity forward so that it is forward of the center of lift of the wing system. The friction clutch 93 is arranged or adjusted so that no slippage occurs when it is subjected to the highest torque normally produced by the engine at any point in its cycle when delivering its maximum power. This clutch is, however, adapted to slip when it becomes subjected to excessive torque produced, for example, by the tendency of the engine system and the propeller system to act as fly wheels oscillating relative to each other. This effect can be prevented from building up excessive periodic torque stresses by the slippage of the clutch under these excessive stresses, energy being absorbed and dissipated as heat within the clutch, and the oscillations being thus effectively damped. I prefer to adjust the clutch so that it can take a torque substantially above any torque produced by the engine while, at the same time, insuring slippage of the clutch at a torque below the elastic limit of the parts by a reasonable safety factor. If it is desired to make the torque more uniform, the clutch should be arranged to slip closer to the lower torque limit above stated, while if it is desired to minimize the energy losses and the heating of the clutch, it should be arranged to slip closer to the higher torque limit. When V belts are employed, the slip-page between the belts and the pulleys should be arranged to perform the function of the slipping clutch. It is to be noted that in this embodiment of the invention, the upper part of the pylon 55 may be substantially smaller than it is when the propeller is driven by belt and pulley. This is due to the fact that very large power can be transmitted through very small bevel gears by the use of high quality alloy gear steels for instance, molybdenum steel, which are preferred for the gears 86 and 87. The reduction in size resulting from this construction can more readily be appreciated by comparing Fig. 6 with Fig. 11.

In order to provide for the cooling of the motor 73, I provide a wall 95 in the fuselage some distance behind the edge 57 and a wall 96, some distance ahead of this edge and ahead of the cylinders 97 of the engine 73. I provide horizontal baffles 98 on either side of the cylinders and I provide a wall 99 which extends from the upper side of the fuselage at a point substantially adjacent the edge 57. The wall 99 extends downwardly to a position above the bottom of the fuselage and then upwardly to the rearmost baffle 98. Between the two walls 95 and 99, I provide in the upper surface of the fuselage an opening 100. This opening may be closed by a forwardly directed scoop 101 which is biased towards closing position by a spring 102. When the scoop is open, as shown in Fig. 1, and the propeller 69 is operating, the slip stream of the propeller is projected in part against the scoop 101 and the air is caused to flow into the scoop, thence forwardly and upwardly through the high pressure compartment, and thence into the low pressure compartment above the baffles 98 and between the wall 96 and the wall 99.

Adjacent the rear edge of the pylon, I provide two doors 103 which are pivotally mounted at 104 and are rigidly connected to arms 105 located within the low pressure compartment. The doors 103, which are adapted to open outwardly, are located in front of the propeller and preferably adjacent the rearwardly extending portion of the fuselage so that the portion of the propeller adjacent the tip passes closely behind the door openings and creates a suction which effectively aids in creating a strong flow of air through the engine fins. This air is admitted through the opening 100 under substantial pressure due both to the movement of the machine through the air and also to the additional velocity of the air due to the slip stream of the propeller.

The doors 103 are biased to closed position by a spring 106 and are adapted to be opened by cords 107 which are connected to the arms 105. The cords 107 pass over sheaves 108, extend forwardly and are connected to a cord 109 which is secured to an arm 110 rigidly carried by the scoop 101. The cord 109 is connected to a lever 111 suitably located adjacent the pilot's position. By suitable manipulation of the lever 111, the scoop 101 and doors 103 may be opened to any desired extent. When the engine is not operating, the lever 111 may be moved to its most rearward position, and the scoop 101 and doors 103 are then closed by the springs 102 and 106, thus eliminating all cooling drag. It is to be noted that with this cooling system, the engine is effectively cooled by the large current of air induced by the pressure difference between opposite sides of the propeller, which pressure difference exists whenever the propeller is turning rapidly, even when the aircraft is moving at relatively slow speed or is standing still upon the ground. Due to the utilization of both the reduced pressure in front of the propeller, as well as the increased pressure behind the propeller, a larger total pressure difference may be maintained across the cooling surfaces of the engine, and cooling greatly enhanced, particularly under conditions of climb, take-off, and ground running. Also, the scoop 101 and the doors 103 may be operated with a very small degree of opening at high speed or when maximum cooling is not required so as to occasion the minimum cooling drag.

Although the invention has been described in connection with these specific details of preferred embodiments thereof, it must be understood that such details are not intended to be limitative of the invention except as set forth in the accompanying claims.

Having thus described my invention, I declare that what I claim is:

1. In a folding screw propeller, a rotatable propeller shaft, a hub and counterweight member pivotally mounted thereon, a blade carried by said hub member, said hub, counterweight and blade being unbalanced relative to the propeller shaft when the blade is parallel to said shaft whereby said elements are moved by centrifugal force to a position in which said blade is substantially perpendicular to the major axis of said shaft when said shaft is rotated, and means including means operating under the influence of the air stream for causing the blade to move to a streamlined position by causing the major axis of said blade to lie coaxial with the major axis of said shaft member when the rotation of said shaft member is reduced to a low speed.

2. In a folding screw propeller, a projecting bearing support member, a rotatable propeller shaft extending through said member, a hub and a counterweight member carrying a blade, bearing means pivotally connecting said hub and counterweight member with said propeller shaft to permit said hub and counterweight member to lie in a position generally parallel to and in a position generally perpendicular to said propeller shaft, said counterweight member being adapted in its said parallel position to engage and conform with said projecting bearing support, said counterweight, hub and blade being unbalanced relative to the shaft in said parallel position, whereby centrifugal force resulting from rotation of the shaft causes the counterweight, hub and blade to move into said perpendicular position.

3. In a folding screw propeller, a rotatable propeller shaft, a bearing supporting member for said shaft of generally tapering form, a hub member pivotally mounted on said shaft adjacent the apex of the tapering support member, a counterweight on said hub adapted to seat around the tapering supporting member in one position of the hub, a blade carried by said hub in opposition to said counterweight, and means biasing said hub towards the position in which the counterweight seats around the supporting member and the blade is substantially parallel to the shaft, said counterweight, hub and blade being unbalanced relative to said shaft when the blade is parallel to the shaft, whereby the blade is swung by centrifugal force resulting from rotation of said shaft into a position generally perpendicular to said shaft.

4. A propeller assembly including a shaft, a bearing supporting member of generally conical form, a hub member pivotally mounted on the shaft, a blade carried by the hub, a counterweight in opposition to said blade, said counterweight being movable with said hub and being of generally divergent form, said counterweight being recessed to receive the conical supporting member in one position of the hub, and a spring biasing said hub towards said position, said counterweight and associated elements being unbalanced relative to said shaft in said position, whereby rotation of the shaft causes the counterweight to swing away from the bearing supporting member.

EDWARD F. ANDREWS.